(12) United States Patent
Laakso (10) Patent No.: US 8,678,720 B2
(45) Date of Patent: Mar. 25, 2014

(54) TAPPING ATTACHMENT

(76) Inventor: Brian John Laakso, Medfield, MA (US)

( * ) Notice: Subject to any disclaimer, the term of this patent is extended or adjusted under 35 U.S.C. 154(b) by 786 days.

(21) Appl. No.: 12/924,835

(22) Filed: Oct. 6, 2010

(65) Prior Publication Data

US 2012/0087754 A1   Apr. 12, 2012

(51) Int. Cl.
   *B23G 1/18*   (2006.01)
(52) U.S. Cl.
   USPC ............ 408/110; 408/126; 408/140; 470/181
(58) Field of Classification Search
   USPC ......... 408/110, 124, 125, 126, 132, 134, 139, 408/140; 470/96, 102, 103, 181
   See application file for complete search history.

(56) References Cited

U.S. PATENT DOCUMENTS

| | | | |
|---|---|---|---|
| 867,077 A * | 9/1907 | Porteous | 408/126 |
| 1,172,336 A * | 2/1916 | Anderson | 408/62 |
| 1,173,573 A * | 2/1916 | Hayden | 470/66 |
| 1,502,016 A * | 7/1924 | Byrne | 408/62 |
| 1,525,134 A * | 2/1925 | Hubbell | 476/26 |
| 1,778,265 A * | 10/1930 | Lopez | 408/126 |
| 2,189,152 A | 2/1940 | Procunier | |
| 2,237,905 A * | 4/1941 | Haffling | 408/65 |
| 2,305,718 A * | 12/1942 | Lanman | 408/126 |
| 2,403,484 A * | 7/1946 | Ashworth | 408/62 |
| 3,105,982 A * | 10/1963 | Yost et al. | 408/126 |
| 3,828,383 A | 8/1974 | Johnstone | |
| 5,358,362 A | 10/1994 | Johnson | |
| 5,865,575 A | 2/1999 | Johnson | |
| 7,708,506 B2 | 5/2010 | Johnson et al. | |

FOREIGN PATENT DOCUMENTS

JP      04183523 A  *  6/1992   ............... B23G 1/16

* cited by examiner

*Primary Examiner* — Daniel Howell
*Assistant Examiner* — Michael Vitale
(74) *Attorney, Agent, or Firm* — Kriegsman & Kriegsman (57) ABSTRACT

A radial tapping attachment for a motor-driven tool includes an enclosed, box-shaped housing, a main shaft assembly adapted to retain a tap, a drive mechanism rotatably driven by the tool and a guide member assembly for supporting an object to be tapped. The main shaft assembly includes a main shaft rotatably coupled to the housing by a pair of bearings, a pair of spaced apart discs fixedly mounted on the main shaft, and a pair of axially mounted compression springs that allow for slight, bi-directional, axial displacement of the main shaft relative to the housing. The drive mechanism includes a drive shaft rotatably coupled to the housing at an approximate right angle relative to the main shaft and a drive wheel mounted on the drive shaft that selectively engages the pair of discs to rotate the main shaft in either direction when an axial force is applied to the tap.

10 Claims, 11 Drawing Sheets

TAPPING ATTACHMENT

BACKGROUND OF THE INVENTION

The present invention relates generally to tools and more particularly to tools designed principally for use in tapping applications.

Taps are cutting tools that are used to create a screw thread, or threading, in the surface that immediately defines a hole. In this capacity, a tap can be used to form a threaded female element (e.g., a nut) that is adapted to matingly receive a threaded male element (e.g., a bolt). As defined herein, use of the term "tapping" relates to both the act of creating screw threads in a previously unthreaded surface as well as the process of reshaping existing screw threads, which is also commonly referred to as "re-tapping" or "re-threading" in the art.

Taps that are designed to be manually operated are commonly referred to as hand taps. To create a threaded surface using a hand tap, a hole is first drilled or otherwise formed into a material, the diameter of the hole being slightly smaller than the diameter of the intended tap. With the hole formed, a hand tap is rotatably driven through the hole to cut the threading into the hole defining surface.

Although well known and widely used in the art, hand taps suffer from a number of notable shortcomings. Specifically, hand taps has been found to be, among other things, labor intensive, time consuming and relatively imprecise (i.e., prone to the introduction of human misalignment errors).

Accordingly, tapping attachments for motor driven machines are well known in the art. In particular, tapping attachments are commonly designed for use in connection with a conventional drill press. In this circumstance, the tapping attachment is coupled to the spindle for the drill press in coaxial alignment therewith (i.e., such that the tapping attachment is disposed in a generally vertical orientation). In use, the spindle is rotatably driven by the drill head motor, thereby similarly rotating the coaxial tapping attachment. With the material to be threaded positioned in place on the drill press table, a set of handles extending from a central hub are turned to vertically displace the spindle down towards the material to be threaded. Downward displacement of the spindle similarly coaxially aligns the tap attachment within the vertical bore in the material, the rotation of the tap attachment creating the tapping within the bore defining surface. Once the hole has been tapped to a desired distance, the direction of the rotation of the tap attachment is reversed in order to unthread the tap attachment from the workpiece.

Tapping attachments of the type described above often suffer from a notable shortcoming. Specifically, the vertical orientation of coaxially disposed tapping attachments renders its use relatively inconvenient and, on occasion, unfeasible when undertaken in work environments of limited size or when used to tap items that are long and/or irregular in shape.

Accordingly, tapping attachments that allow for radial tapping (i.e., tapping at an angle perpendicular to the longitudinal axis of a drill press spindle) are well known in the art. For example, in U.S. Pat. No. 5,358,362 to A. S. Johnson, there is disclosed a tapping attachment for use in connection with radial tapping comprises a tap spindle member rotatable in a tapping direction, a driven part engageable with a driving part from a power source in a different direction from the tapping direction, a forward drive member engageable with the tap spindle member to drive the tap spindle member in the tapping direction, a reverse drive member engageable with the tap spindle to drive it in a direction opposite to the tapping direction, means for transmitting drive to the forward drive member and the reverse drive member and engageable with the driven part for receiving drive and with the tap spindle member. The forward drive member and the reverse drive member are moveable axially along the tapping direction relative to the tap spindle member and upon relative axial movement in a direction opposite to the tapping direction, the forward drive member disengages from the tap spindle member and the reverse drive member engages in driving engagement with the tap spindle member to impart reverse rotation to the tap spindle member.

Although well known in the art, radial tapping attachments of the type described in detail above have been found to suffer from a couple notable drawbacks.

As a first drawback, radial tapping attachments of the type described above are typically mechanically complex in construction, thereby increasing overall manufacturing costs, which is highly undesirable.

As a second drawback, radial tapping attachments of the type described above provide limited tactile response to the operator, thereby increasing the likelihood of tapping imprecision, which is highly undesirable.

SUMMARY OF THE INVENTION

It is an object of the present invention to provide a novel tapping attachment for a motor-driven tool, such as a drill press.

It is another object of the present invention to provide a tapping attachment for a motor-driven tool that has a limited number of parts, is easily to operate and is inexpensive to manufacture.

It is yet another object of the present invention to provide a tapping attachment as described above that allows for radial tapping.

It is yet still another object of the present invention to provide a tapping attachment as described above that provides the operator with enhanced tactile response.

Therefore, according to one feature of the present invention, there is provided a tapping attachment for a motor-driven tool, the tapping attachment comprising (a) a housing, (b) a main shaft assembly adapted to retain a tap, the main shaft assembly comprising a main shaft that is coupled to the housing and capable of bi-directional axial rotation, and (c) a drive mechanism, the drive mechanism comprising a drive shaft rotatably coupled to the housing at an approximate right angle relative to the main shaft, the drive mechanism selectively engaging the main shaft assembly so as to rotate the main shaft in either axial direction.

Various other features and advantages will appear from the description to follow. In the description, reference is made to the accompanying drawings which form a part thereof, and in which is shown by way of illustration, an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE PREFERRED EMBODIMENT

Referring now to FIGS. 1-4, there is shown a tapping attachment that is constructed according to the teachings of the present invention and identified generally by reference numeral 11. As will be described further in detail below, tapping attachment 11 allows for radial tapping with enhanced operator tactile response using a standard tap 13 that is powered by a conventional drill press 15, which is highly desirable.

As previously defined, use herein of the term "tapping" relates to both the act of creating screw threads in a previously unthreaded surface as well as the process of reshaping existing screw threads, which is also commonly referred to as "re-tapping" or "re-threading" in the art.

Tapping attachment 11 is shown herein with standard tap 13. However, it should be noted that tapping attachment 11 is not limited to use with tap 13. Rather, it is to be understood that tapping attachment 11 could similarly retain alternative sizes and styles of taps without departing from the spirit of the present invention.

Similarly, tapping attachment 11 is shown herein as being coupled to and, in turn, driven by drill press 15, which is represented in block form for simplicity purposes only. However, it should be noted that tapping attachment 11 is not limited to be powered by a drill press. Rather, it is to be understood that tapping attachment 11 could be similarly rotatably driven by alternative types of vertically disposed motor-driven tools without departing from the spirit of the present invention.

Construction of Tapping Attachment 11

As will be described in detail below, tapping attachment 11 comprises a housing 17, a main shaft assembly 19 that is rotatably mounted on housing 17, a drive mechanism 21 that selectively engages and rotates main shaft assembly 19, and a guide member assembly 23 for supporting the object to be tapped.

Referring now to FIGS. 1-5, housing 17 is represented herein as being in the form of a six inch, enclosed, box-shaped chassis, or cabinet, that is preferably constructed from a rigid and durable material, such as steel. However, it should be noted that housing 17 is not limited to the size and shape set forth above. Rather, it is to be understood that the particular configuration and dimensions of housing 17 could be modified without departing from the spirit of the present invention.

Housing 17 is represented herein as comprising a four-sided main chassis 25 that includes an enclosed top wall 25-1, an enclosed bottom wall 25-2, an enclosed left side wall 25-3 and an enclosed right side wall 25-4 that together define an open front surface 25-5 and an open rear surface 25-6. In addition, housing 17 includes a front cover 27-1 and a rear cover 27-2, each cover 27 being in the form of a square-shaped plate. As can be appreciated, front cover 27-1 and rear cover 27-2 are designed to be removably secured by screws (not shown) to main chassis 25 over open front and rear surfaces 25-5 and 25-6, respectively, to yield a unitary, enclosed box-shaped housing 17 that is shaped to define a hollowed interior cavity 29.

Housing 17 further comprises a plurality of adhesive backed bumpers 31 that are affixed to the outer surface of enclosed bottom wall 25-2 in a spaced apart relationship (e.g., at each corner). Preferably, each bumper 31 is constructed of a medium durometer, high friction material, such as polyurethane, that prevents tapping attachment 11 from sliding or damaging the work surface on which it placed.

Referring now to FIGS. 1-3 and 6, main shaft assembly 19 comprises a main shaft, or axle, 33 that is rotatably coupled to housing 17, a pair of discs 35-1 and 35-2 fixedly mounted on main shaft 33 in a predefined, spaced apart relationship, a pair of opposing compression springs 37-1 and 37-2 coaxially mounted on main shaft 33, and a drill chuck 39 fixedly mounted on one end of shaft 33 for releasably holding tap 13.

Figure 7A:
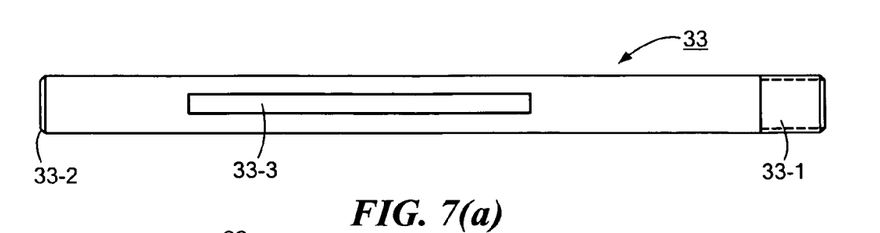
FIGS. 7(a) and 7(b) are left side and front views, respectively, of the main shaft shown in FIG. 6.
Figure 7B:
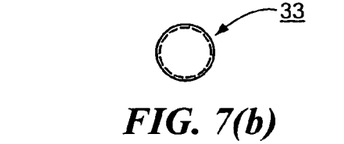

Main shaft, or axle 33, which is shown in isolation in FIGS. 7(a) and 7(b), is preferably in the form of an elongated cylindrical rod that is constructed of a rigid and durable material, such as steel. Shaft 33, which preferably has an outer diameter of approximately 0.5 inches and an overall length of approximately 7.0 inches, includes a threaded first end 33-1, a second end 33-2 and an intermediate portion 33-3.

Main shaft 33 extends the length of interior cavity 29 in a horizontal, back-to-front axial orientation with first end 33-1 of shaft 33 protruding out through front cover 27-1. As noted briefly above, main shaft 33 is rotatably coupled to housing 17. Specifically, front and rear bearings 41-1 and 41-2 are fixedly mounted onto the interior surface of front and rear covers 27-1 and 27-2, respectively, by screws (not shown). Each bearing 41 includes a rotatable ½ inch diameter sleeve that is dimensioned to fittingly receive a portion of shaft 33 and thereby allow for axial rotation of shaft 33 (i.e., rotation about its longitudinal axis) relative to housing 17.

Figures 8A, 8B:
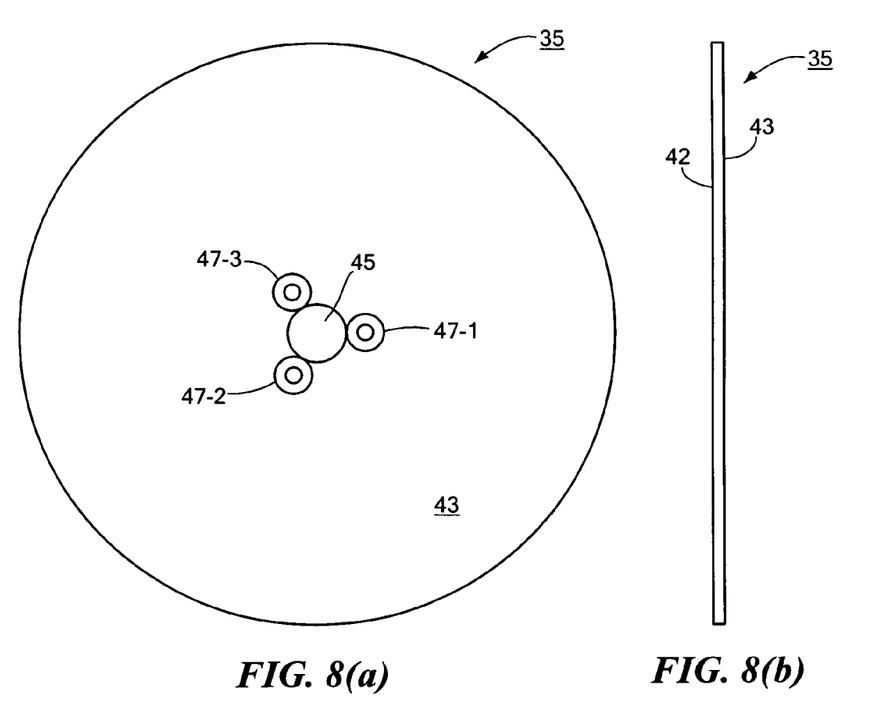
FIGS. 8(a) and 8(b) are front and left side views, respectively, of one of the pair of discs shown in FIG. 6.

Discs 35-1 and 35-2 are coaxially mounted on main shaft 33 and are spaced apart from one another a fixed, predetermined distance of approximately 1.75 inches (for reasons to become apparent below). Each disc 35, one of which is shown in isolation in FIGS. 8(a) and 8(b), has an outer diameter of approximately 5.0 inches and includes a substantially flattened rear surface 42 and a substantially flattened front surface 43. In addition, each disc 35 is shaped to define a central opening 45 that is dimensioned to fittingly receive main shaft 33 as well as a plurality of countersunk mounting holes 47-1, 47-2 and 47-3 equidistantly arranged about the periphery of central opening 45.

Figure 9A:
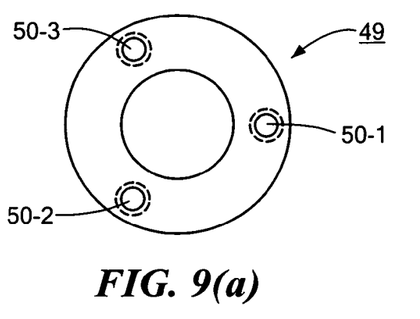
FIGS. 9(a) and 9(b) are front and left side views, respectively, of one of the pair of collars shown in FIG. 6.
Figure 9B:
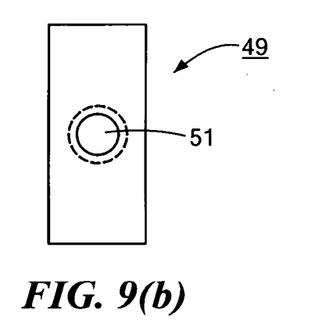
Figure 10:
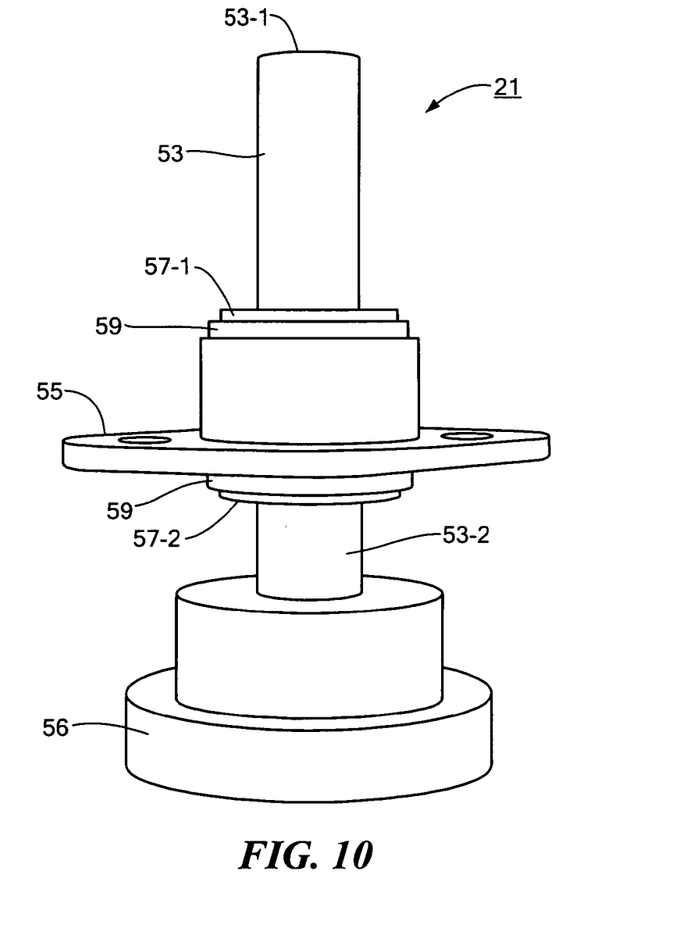
FIG. 10 is a left side perspective view of the drive mechanism shown in FIG. 3.

A pair of aluminum shaft collars 49-1 and 49-2 is mounted on main shaft 33, each collar 49 being disposed immediately outside a corresponding disc 35. Each collar 49, one of which is shown in isolation in FIGS. 9(a) and 9(b), is generally annular in shape and includes an inner diameter of approximately 0.5 inches and an outer diameter of approximately 1.0 inches. In addition, each collar 49 is shaped to define a plurality of internally threaded, transverse thru-holes 50-1, 50-2 and 50-3 which are arranged to directly align with mounting holes 47-1, 47-2 and 47-3, respectively, on an associated disc 35 when main shaft assembly 19 is in its proper assembled form. In this capacity, each collar 49 is designed to be fixedly secured against the outer surface of a corresponding disc 35 by driving a flat-head screw (not shown) through each mounting hole 47 and into threaded engagement with a corresponding transverse thru-hole 50.

With each collar 49 fixedly secured to a corresponding disc 35 in the manner described in detail above, a hex screw 51 is inwardly driven through a corresponding radial bore formed in each collar and into frictional engagement with main shaft 33. In this capacity, collars 49 serve to retain discs 35 in a fixed position along main shaft 33.

A pair of opposing compression springs 37-1 and 37-2 is coaxially mounted on main shaft 33, with first compression spring 37-1 disposed between front bearing 41-1 and shaft collar 49-1 and second compression spring 37-2 disposed between rear bearing 41-2 and shaft collar 49-2. Each compression spring 37 is made from 0.045 inch wire and is approximately 1.5 inches long and approximately 0.6 inches in outer diameter. As will be described further below, compression springs 37 enable main shaft 33, as well as discs 35 fixedly mounted thereon, to be displaced axially in either a linear forward direction, as represented by arrow F in FIGS. 3 and 6, or a linear rearward direction, as represented by arrow R in FIGS. 3 and 6.

As noted briefly above, first end 33-1 of shaft 33 protrudes out through front cover 27-1 and is adapted to threadingly receive drill chuck 39. Accordingly, with tap 13 fixedly retained in the free end of drill chuck 39, rotation of shaft 33 serves to similarly rotate tap 13.

Referring now to FIGS. 1-4 and 10, drive mechanism 21 extends vertically through top wall 25-1 and is designed to selectively engage discs 35 in order to drive (i.e., axially rotate) main shaft 33 about its longitudinal axis in either direction. Drive mechanism 21 comprises a drive shaft 53 extending vertically through top wall 25-1 at a right angle relative to main shaft 33, a top bearing 55 for rotatably coupling drive shaft 53 to housing 17, and a drive wheel 56 fixedly mounted on the inner end of drive shaft 53.

Drive shaft 53 is a cylindrical steel rod that has a length of approximately 3.0 inches and an outer diameter of approximately 0.375 inches. As noted briefly above, drive 53 extends vertically through top wall 25-1 at a right angle relative to main shaft 33 with its first end 53-1 disposed outside of housing 17 and its second end 53-1 disposed within interior cavity 29 between discs 35.

Top bearing 55 is axially mounted on drive shaft 53 and is capable of rotation relative thereto. A pair of E-style, 0.375 inch retaining rings 57-1 and 57-2 are axially mounted on shaft 53 on opposite ends of top bearing 55, each ring 57 being spaced away from bearing 55 by a corresponding washer 59. In this manner, retaining rings 57 serve to hold top bearing 55 in place on shaft 53, thereby precluding longitudinal displacement, or sliding, of bearing 55 along the length of shaft 53.

As seen most clearly in FIGS. 1-4, top bearing 55 is fixedly mounted onto the outer surface of top wall 25-1 by a pair of screws (not shown). With top bearing 55 fixedly secured to housing 17, it is to be understood that drive shaft 53 is capable of rotation about its longitudinal axis but is incapable of longitudinal, or vertical, displacement.

Figure 11A:
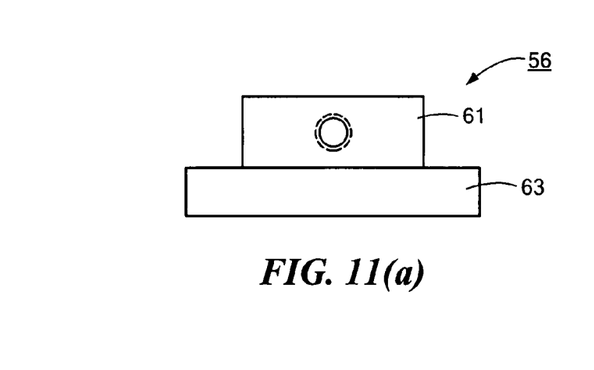
FIGS. 11(a) and 11(b) are left side and top views, respectively, of the drive wheel 56 shown in FIG. 10.
Figure 11B:
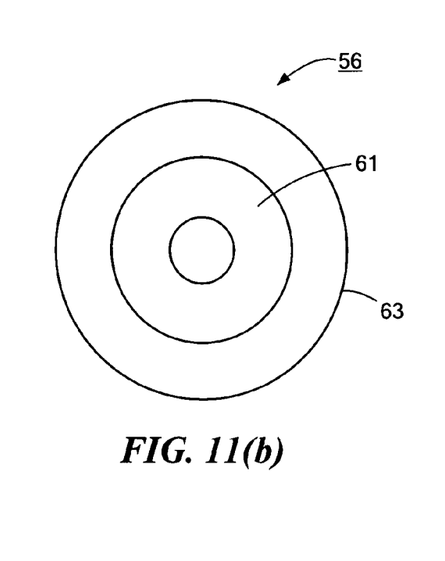

Drive wheel 56, which is shown in isolation in FIGS. 11(a) and 11(b), is axially mounted on the second end 53-2 of drive shaft 53 and comprises a reduced diameter, aluminum hub, or collar 61 and a widened, 1.625 inch diameter urethane roller 63. A hex set screw is radially driven through collar 61 an into engagement with drive shaft 53 to fixedly secure drive wheel 56 in place on second end 53-2.

As will be described further in detail below, roller 63 is dimensioned and positioned to align between discs 35-1 and 35-2 in a spaced apart relationship relative thereto. As such, it is to be understood that roller 63 of drive wheel 56 only contacts discs 35 when a axial force is applied to main shaft 33 that compresses either of springs 37.

It should be noted that first end 53-1 of drive shaft 53 is dimensioned for insertion into the chuck for drill press 15. Accordingly, activation of drill press 15 serves to rotate drive shaft 53 clockwise about its longitudinal axis which, in turn, serves to continuously rotate drive wheel 56 in the clockwise direction. As will be described in detail below, the application of a suitable axial force upon main shaft assembly 19 draws roller 63 into direct contact with either disc 35-1 or 35-2 which, in turn, spins main shaft 33 (as well as tap 13) in either the clockwise or counterclockwise direction, respectively.

Referring now to FIGS. 1-4 and 12, guide member assembly 23 comprises a pair of guide posts, or shafts, 65-1 and 65-2 that is fixedly coupled to housing 17 and a guide member 67 that is slidably mounted on shafts 65. As will be described further below, guide member 67 functions, inter alia, as a slidable support for the object to be tapped by tap 13.

As can be seen, guide posts 65 are fixedly secured to the outer surface of front cover 27-1 and extend orthogonally out therefrom in a parallel, spaced apart relationship. Each post 65 is generally cylindrical in shape, approximately 2.5 inches in length, approximately 0.375 inches in diameter and is internally threaded at its inner end. Preferably, each post 65 is disposed in alignment with front bearing 41-1 so that a pair of common screws can be used to secure both front bearing 41-1 and posts 65 to opposite sides of front cover 27-1.

Guide member 67 comprises a flattened guide plate 69, a bracket 71 secured to one surface of guide plate 69, and a pair of parallel sleeves 73-1 and 73-2 fixed to bracket 71, each sleeve 73 being dimensioned to fittingly receive a corresponding guide post 65, as will be described further below.

Figure 13A:
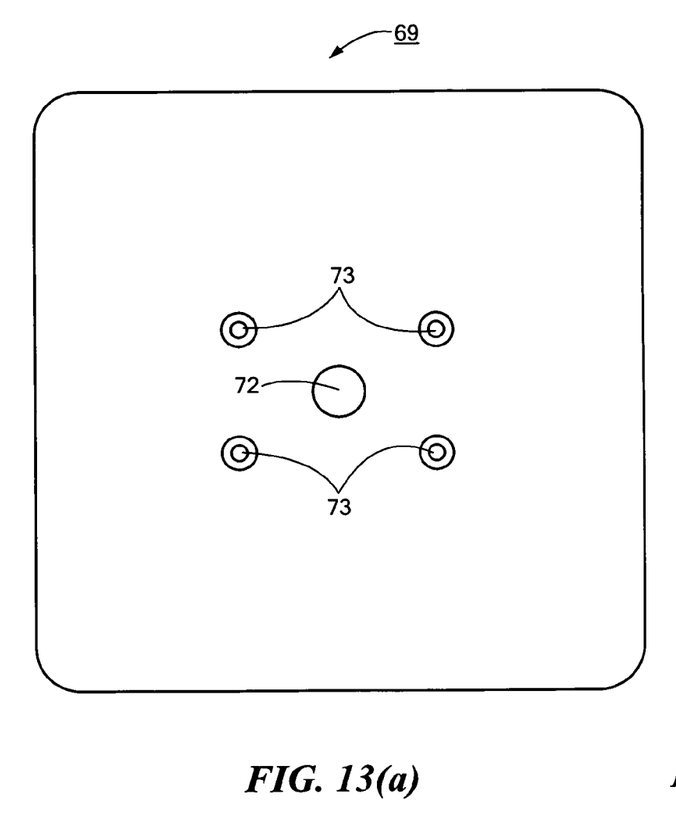
FIGS. 13(a) and 13(b) are rear and left side views, respectively, of the guide plate shown in FIG. 12.
Figure 13B:
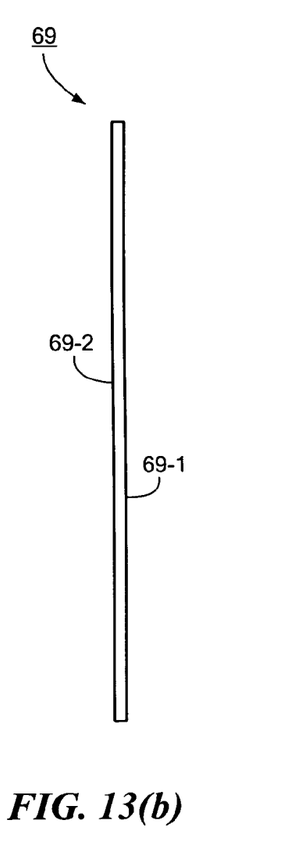

Guide plate 69, shown in isolation in FIGS. 13(a) and 13(b), is constructed as an enlarged, generally square-shaped member that is approximately 6.0 inches in length and width. Guide plate 69 is preferably constructed of a rigid and durable material and includes a flattened front surface 69-1 and a flattened rear surface 69-2. Guide plate 69 is additionally shaped to define an enlarged central bore 72 and a plurality of countersunk mounting holes 73 arranged in a rectangular configuration around bore 72. As can be appreciated, central bore 72 is approximately 0.5 inches in diameter and is aligned so as to enable tap 13 to selectively penetrate therethrough.

Figures 14A, 14B, 14C:
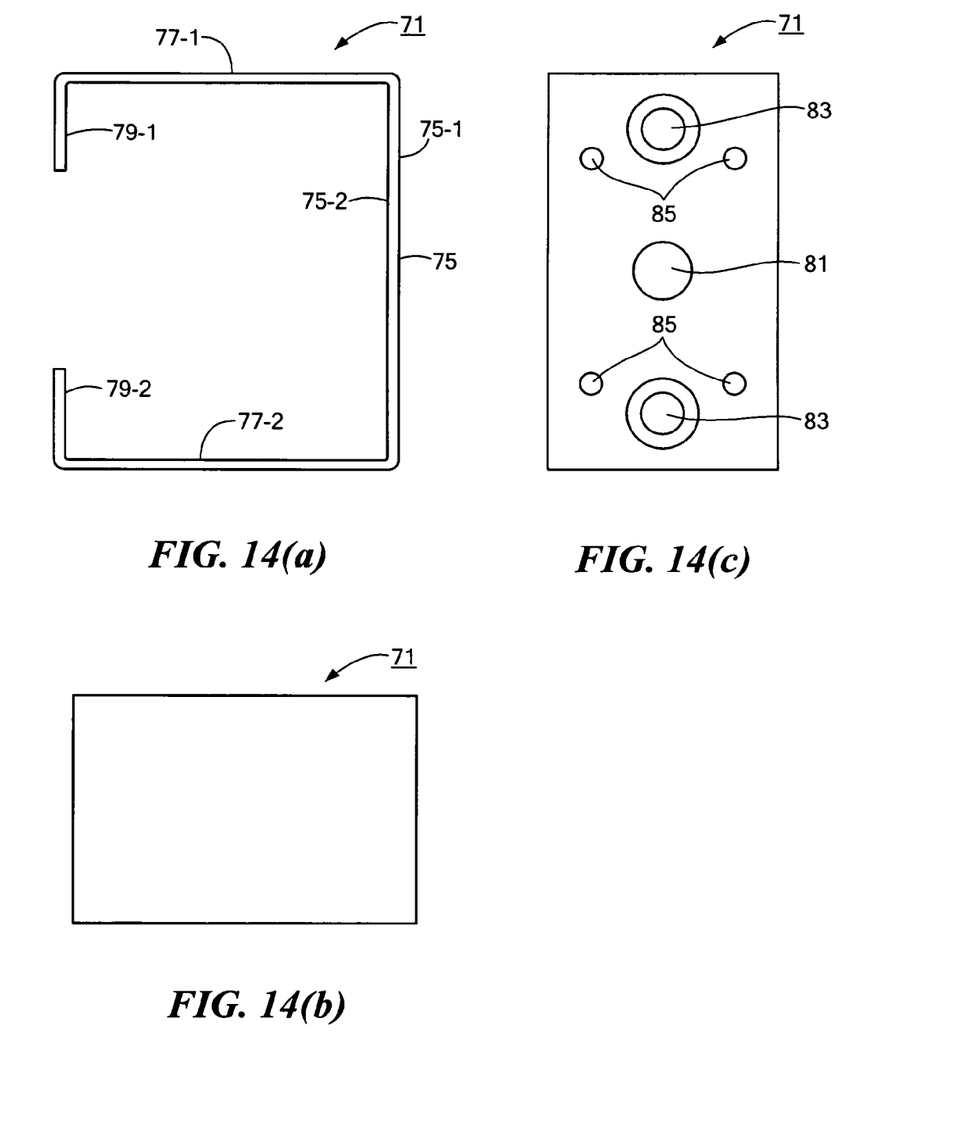
FIGS. 14(a)-(c) are top, left side and front views, respectively, of the bracket shown in FIG. 12.

Bracket 71, shown in isolation in FIGS. 14(a)-(c), is a unitary, rigid, C-shaped member that includes a rectangular base 75, a pair of opposing arms 77-1 and 77-2 that extend orthogonally rearward from base 75 and a pair of shortened tabs 79-1 and 79-2 that extend orthogonally inward from the free end of arms 77-1 and 77-2, respectively, each tab 79 being shaped to define a 0.625 diameter circular opening 80.

As can be seen, base 75 includes a front surface 75-1 and a rear surface 75-2 and is shaped to define a central bore 81 approximately 0.5 inches in diameter, a pair of opposing circular openings 83 approximately 0.625 inches in diameter, and a plurality of 0.213 inch diameter mounting holes 85 arranged in a rectangular configuration around bore 81.

Front surface 75-1 of base 75 is disposed flush against rear surface 69-2 of guide plate 69 with bores 72 and 81 in coaxial alignment with one another. Furthermore, a plurality of fastening element pairs (not shown), such as a threaded screw and complementary nut, are disposed through mounting holes 73 and 85 to fixedly secure guide plate 69 to bracket 71.

Figure 4:
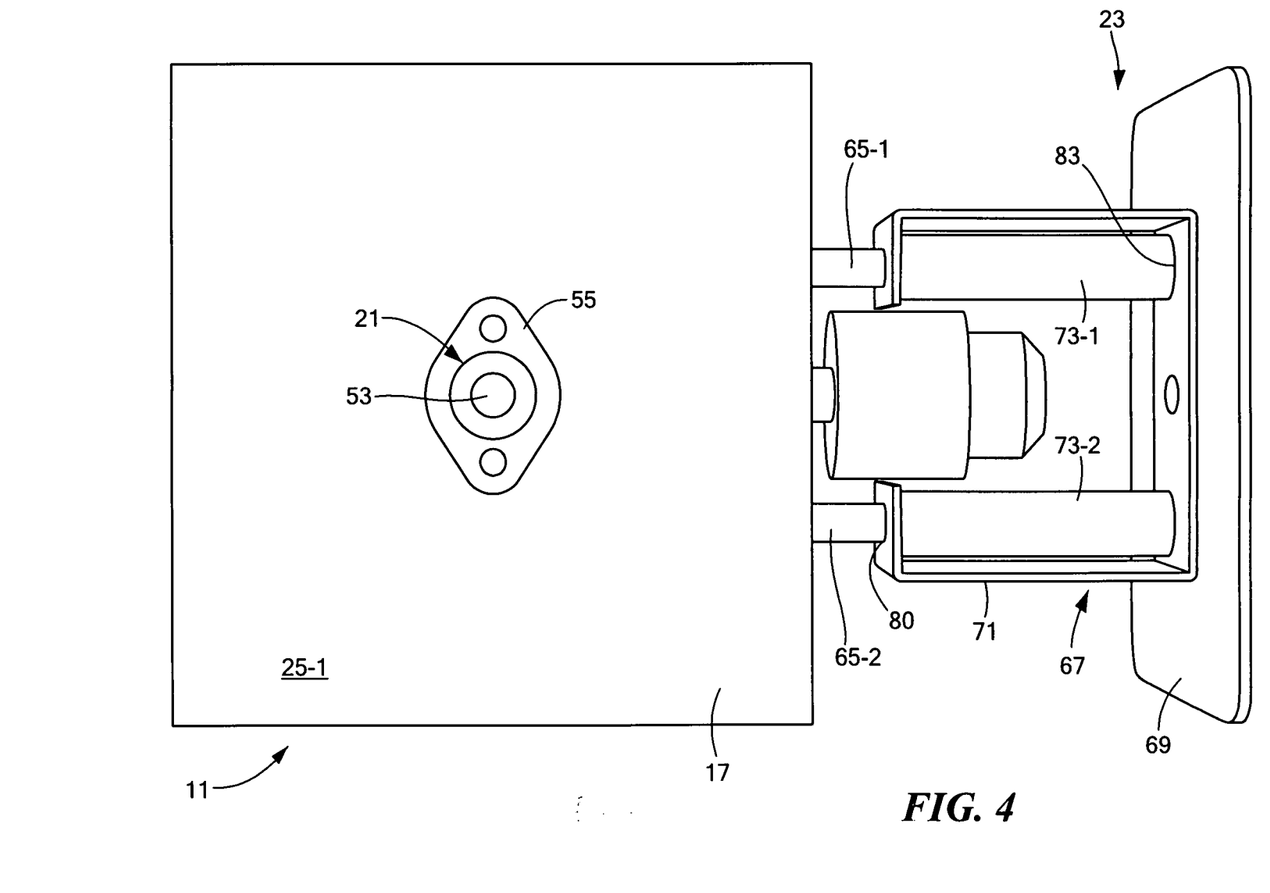
FIG. 4 is a top perspective view of the tapping attachment shown in FIG. 1.
Figure 5:
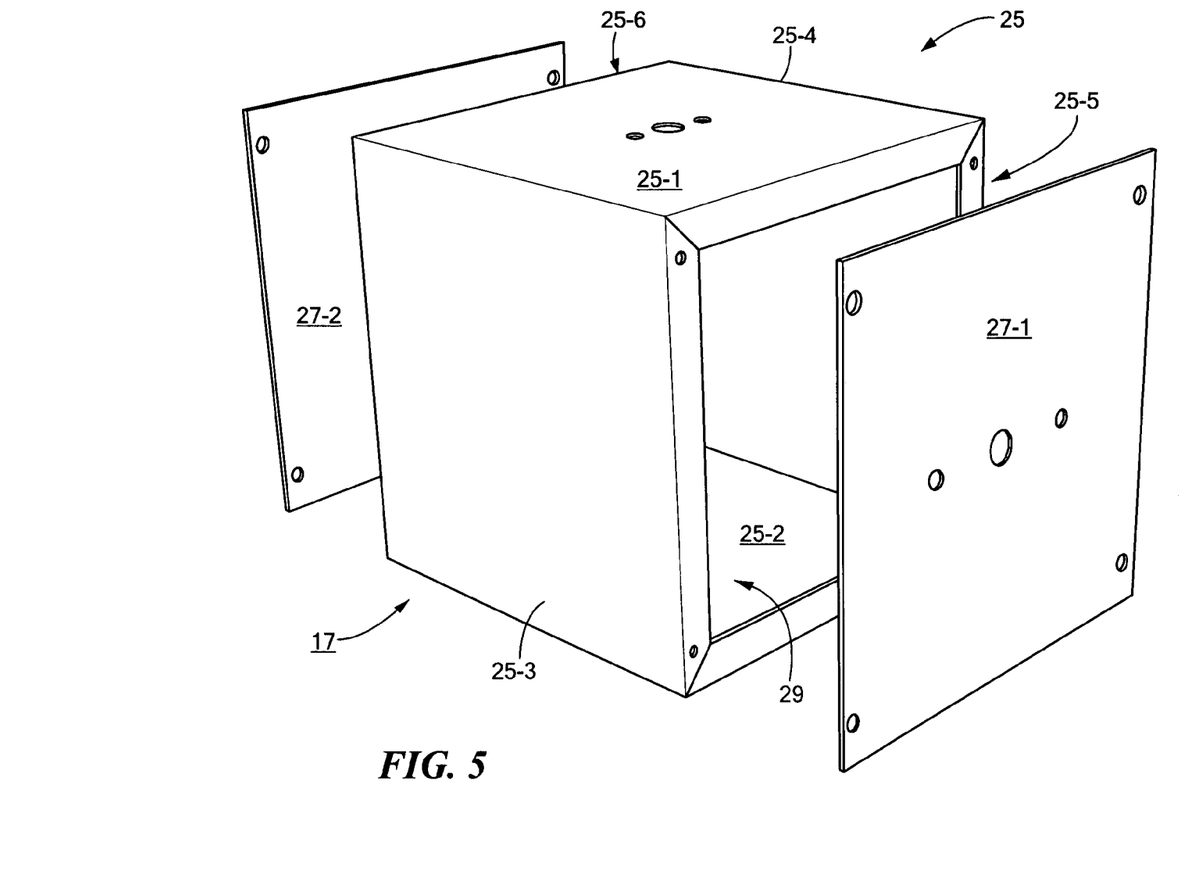
FIG. 5 is an exploded, front perspective view of the housing shown in FIG. 1.
Figure 6:
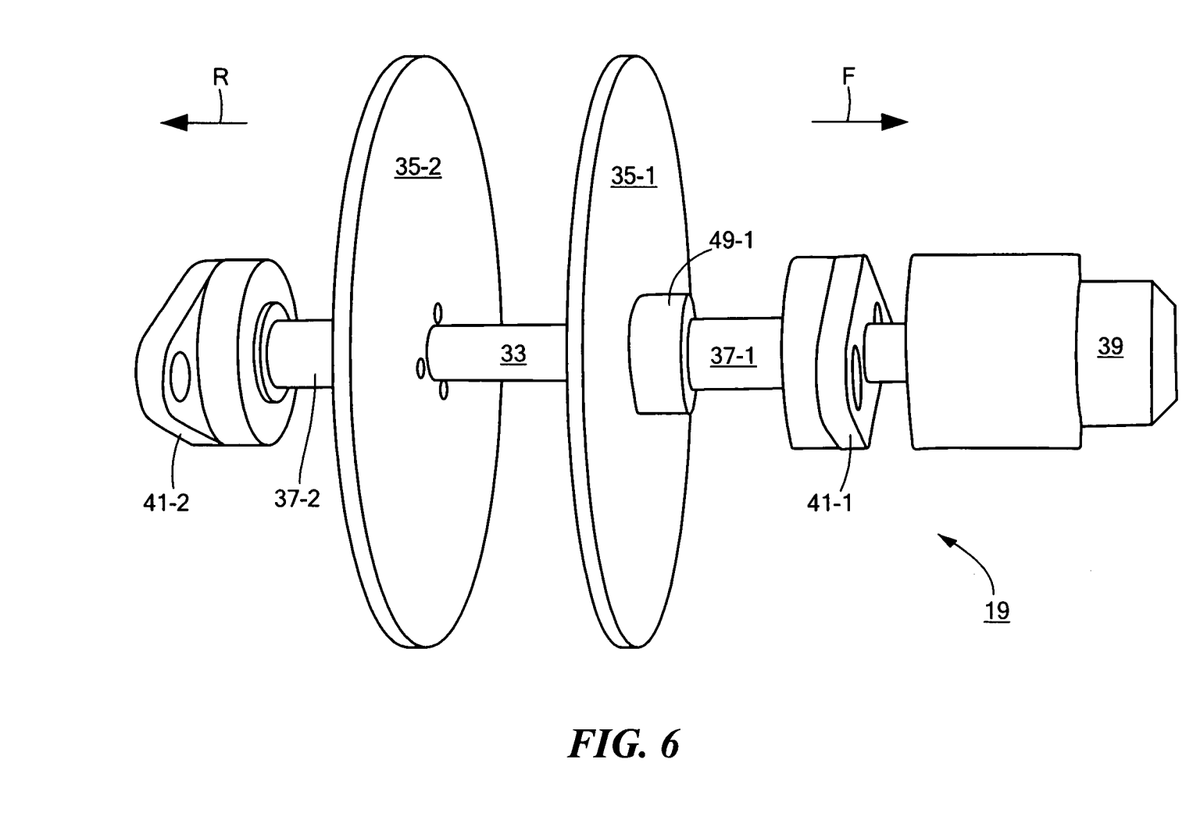
FIG. 6 is a left side perspective view of the main shaft assembly shown in FIG. 3.
Figure 12:
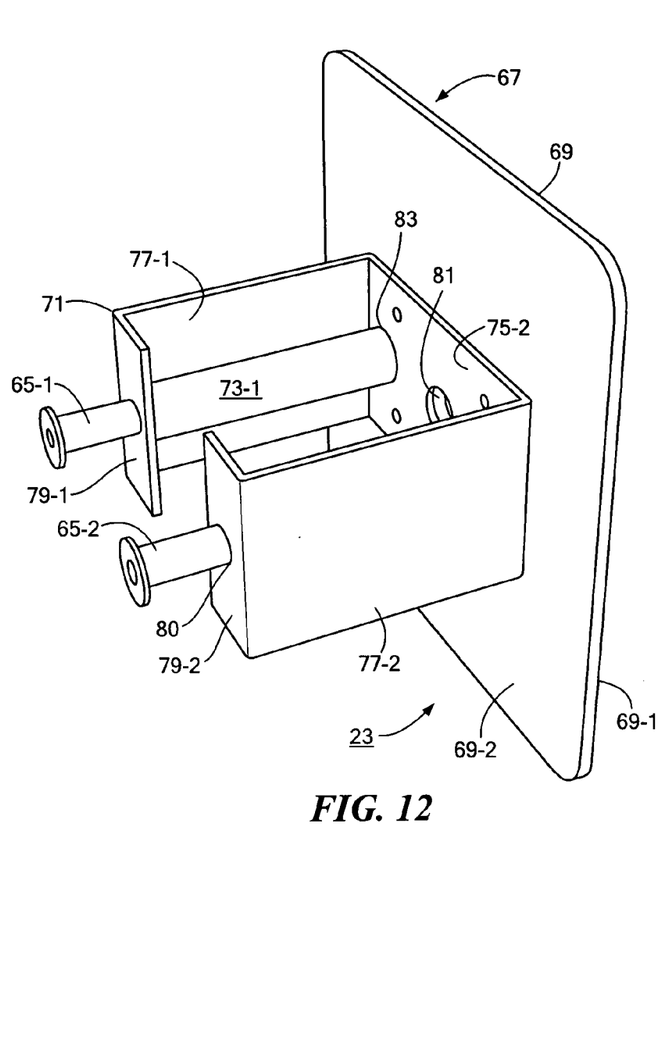
FIG. 12 is a rear perspective view of the guide member assembly shown in FIG. 6.

As seen most clearly in FIGS. 4 and 12, sleeves 73 are fixed to bracket 71 in a parallel, spaced apart relationship. Specifically, sleeves 73 extend inside arms 77 in a parallel relationship relative thereto, with one end of each sleeve 73 fittingly secured within an opening 83 in base 75 and the other end of each sleeve 73 fittingly secured within an opening 80 in each tab 79. Each sleeve 73 is generally cylindrical and has an inner diameter of approximately 0.375 inches and an outer diameter of approximately 0.625 inches.

As can be appreciated, each sleeve 73 is dimensioned to fittingly receive a corresponding guide post 65. Consequently, it is to be understood that guide member 67 is adapted to slide along the lengths of posts 65 in such a manner so that tap 13 selectively protrudes through central bores 72 and 81. In this manner, with an item to be tapped disposed flush against front surface 69-1 of plate 69, the inward displacement of guide member 67 along posts 65 ultimately draws tap 13 through bores 72 and 81 and into contact with the intended item.

Operation of Tapping Attachment 11

In view of the description set forth in detail above, it is to be understood that tapping attachment 11 can be used in the following manner to radially tap an object using a tap 13 that is powered by a drill press 15.

First, a series of set-up steps is undertaken to prepare attachment 11 for use in tapping an intended object. Specifically, attachment 11 is prepared for use by: (1) fixedly retaining tap 13 in chuck 39 using a chuck key or other tightening element, (2) disposing housing 17 in position on the table for the drill press 15, with bumpers 31 frictionally engaging the surface to retain housing 17 in place, (3) lowering the drill head for press 15 until first end 53-1 of drive shaft 53 protrudes into the drill press chuck and, in turn, tightening the drill press chuck so that activation of drill press 15 axially rotates drive shaft 53.

Having completed the preparatory steps, attachment 11 is ready for use in tapping an object. As noted above, activation of drill press 15 serves to similarly rotate drive shaft 53. However, because main shaft assembly 19 is naturally biased such that drive wheel 56 aligns between discs 35-1 and 35-2 in a spaced apart relationship relative thereto, it is to be understood that the rotation of drive mechanism 21 does not similarly rotate main shaft assembly 19. Rather, in the absence of longitudinal pressure on tap 13, main shaft assembly 19 remains inactive.

The item to be tapped is then positioned flush against front surface 69-1 of guide plate 69, with the preformed hole in the item being disposed in coaxial alignment with central bore 72 in plate 69. With the item to be tapped held firmly against guide plate 69, guide member 67 is mounted onto guide posts 65 and slidably advanced in the rearward direction until tap 13 directly aligns within the preformed hole in the item to be tapped.

As can be appreciated, the slight rearward pressure of the item to be tapped against tap 13 causes rear spring 37-2 to compress to the extent necessary that main shaft 33 is axially displaced in rearward direction R. The rearward displacement of main shaft 33 in turn ultimately draws front disc 35-1 in direct contact against roller 63 of rotating drive wheel 56.

Figure 1:
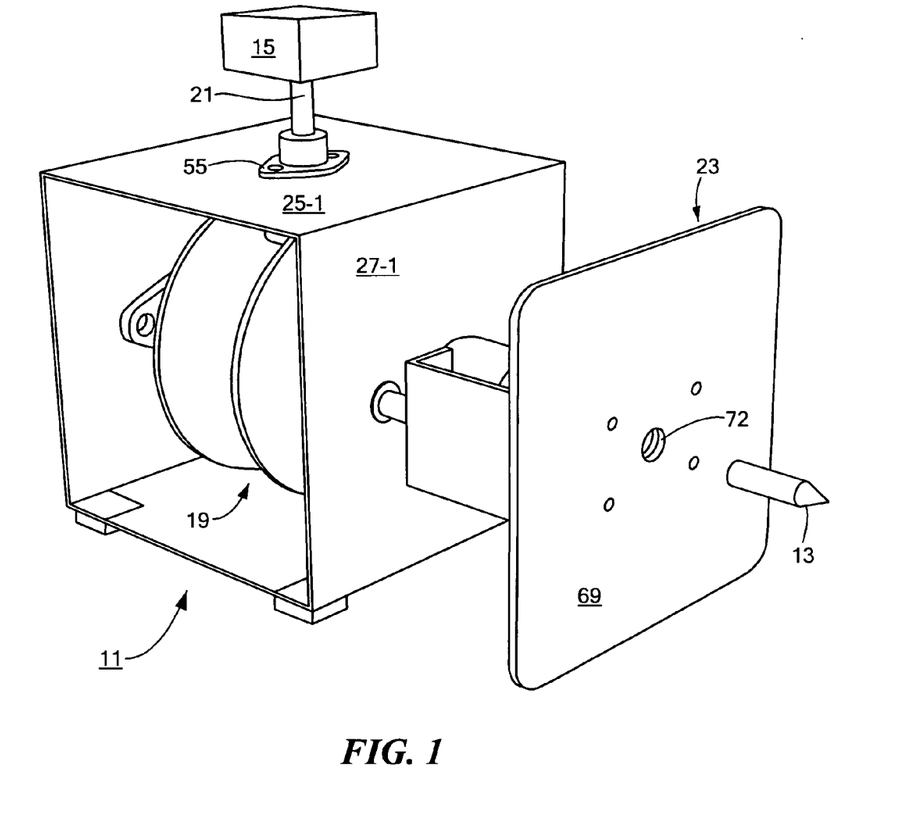
FIG. 1 is a front perspective view of a tapping attachment constructed according to the teachings of the present invention, the tapping attachment being shown with a tap and a drill press exploded therefrom, the left side wall of the housing for the tapping attachment being removed therefrom for ease in viewing internal components.
Figure 2:
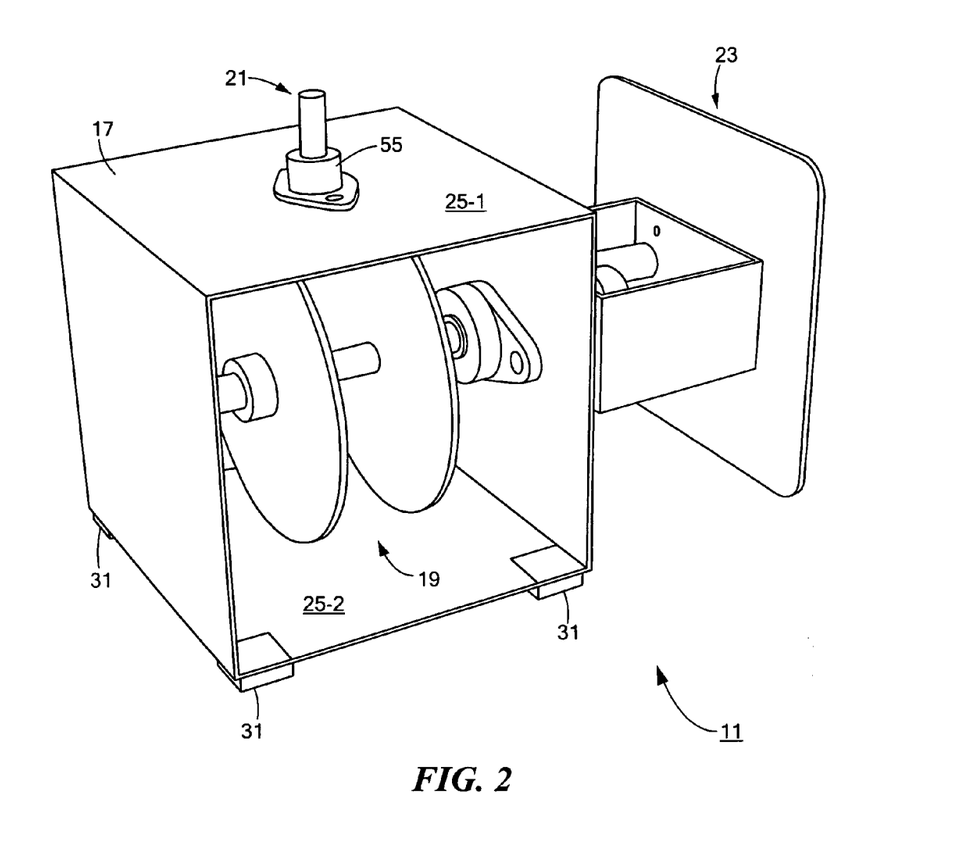
FIG. 2 is a rear perspective view of the tapping attachment shown in FIG. 1.
Figure 3:
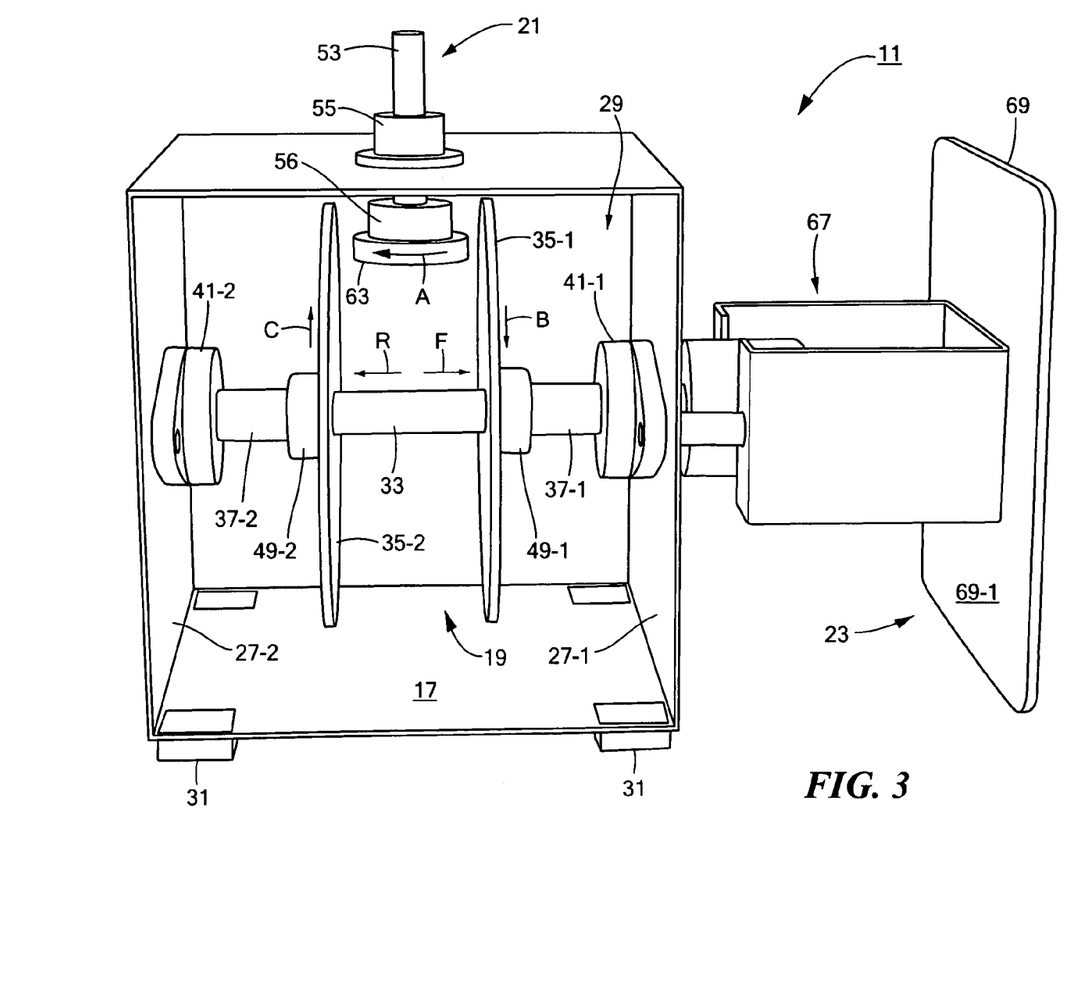
FIG. 3 is a left side perspective view of the tapping attachment shown in FIG. 1.

As seen most clearly in FIG. 3, drive wheel 56 is rotatably driven in the clockwise direction by drill press 15, as represented by arrow A. Accordingly, drawing front disc 35-1 into direct contact with rotatable drive wheel 56 serves to similarly rotate front disc 35-1 in the counterclockwise direction, as represented by arrow B. Because front disc 35-1 is fixedly mounted onto main shaft 33, it is to be understood that the counterclockwise rotation of front disc 35-1 serves, in turn, to rotate chuck 39 in the counterclockwise direction (from the point of view in front of attachment 11). This rotation of chuck 39 in the counterclockwise direction causes tap 13 to penetrate into the bore of the designated item and create, or reshape, threading in the bore defining surface, which is highly desirable.

When the desired depth of threading has been formed in the intended object, the operator terminates the application of pressure against guide member 67. In the absence of pressure, the resilient nature of springs 37 naturally biases main shaft 33 to its original position. Disposed as such, it is to be understood that rotatable drive wheel 56 is disengaged from both discs 35, thereby terminating rotation of chuck 39 (as well as tap 13).

Tap 13 is then backed out from the threaded bore by lightly urging guide member 67 in the forward direction (i.e., away from housing 17) along guide posts 65. The forward displacement of guide member 67 causes the tapped object to gently pull tap 13 which in turn causes front spring 37-1 to compress to the extent necessary that main shaft 33 is axially displaced in forward direction F. The forward displacement of main shaft 33 in turn ultimately draws rear disc 35-2 in direct contact against roller 63 of rotating drive wheel 56.

As noted above, drive wheel 56 is rotatably driven in the clockwise direction by drill press 15. Accordingly, drawing rear disc 35-2 into direct contact with rotatable drive wheel 56 serves to rotate rear disc 35-2 in the clockwise direction, as represented by arrow C. Because rear disc 35-2 is fixedly mounted onto main shaft 33, it is to be understood that the clockwise rotation of rear disc 35-2 serves, in turn, to rotate chuck 39 in the clockwise direction (from the point of view in front of attachment 11). This rotation of chuck 39 in the clockwise direction causes tap 13 to back out cleanly from the bore of the designated item without damaging the screw threading, which is highly desirable.

Once tap 13 has been entirely backed out from the bore of the threaded object, the application of the forward pulling force on tap 13 terminates. In the absence of pressure, the resilient nature of springs 37 naturally biases main shaft 33 back to its original position. Disposed as such, it is to be understood that rotatable drive wheel 56 is disengaged from both discs 35, thereby terminating rotation of chuck 39 (as well as tap 13). In this capacity, tapping attachment 11 operates using a dual, bi-directional clutch mechanism, which is highly desirable.

It should be noted that the particular construction of tapping attachment 11 not only allows for radial tapping but also enhances operator tactile response. In particular, the bi-directional clutch mechanism created between main shaft assembly 19 and drive mechanism 21 limits the force required by the operator during the tapping process using an efficient, limited complexity mechanical design, which is highly desirable.

The embodiment described in detail above is intended to be merely exemplary and those skilled in the art shall be able to make numerous variations and modifications to them without departing from the spirit of the present invention. All such variations and modifications are intended to be within the scope of the present invention as defined in the appended claims.

What is claimed is:

1. A tapping attachment for a motor-driven tool, the tapping attachment comprising:
   (a) a housing,
   (b) a main shaft assembly adapted to retain a tap, the main shaft assembly comprising,
      (i) a main shaft that is coupled to the housing and capable of bi-directional axial rotation,
      (ii) a pair of discs fixedly mounted on the main shaft in a spaced apart relationship, and
      (iii) a pair of compression springs axially mounted on the main shaft, the pair of compression springs enabling the main shaft to be bi-directionally, axially displaced relative to the housing, and
   (c) a drive mechanism, the drive mechanism comprising,
      (i) a drive shaft rotatably coupled to the housing at an approximate right angle relative to the main shaft, the drive shaft being adapted to be releasably coupled to and rotatably driven by the motor-driven tool, and
      (ii) a drive wheel fixedly mounted on the drive shaft, the pair of compression springs returning the main shaft to a naturally biased position in which the drive wheel is aligned between the pair of discs in a spaced apart relationship relative thereto,
   (d) wherein the main shaft is capable of being selectively axially displaced in both a first direction such that the rotatable drive wheel engages one of the pair of discs and a second direction such that the rotatable drive wheel engages the other of the pair of discs, the drive wheel selectively engaging and rotatably driving each of the pair of discs in opposite directions so as to rotate the main shaft in either axial direction, with one of the pair of compression springs returning the main shaft to the naturally biased position when displaced in the first direction and the other of the pair of compression springs returning the main shaft to the naturally biased position when displaced in the second direction.

2. The tapping attachment of claim 1 wherein the housing is in the form of an enclosed box-shaped chassis that includes a top wall, a bottom wall, a left side wall, a right side wall, a front cover and a rear cover that together define an interior cavity.

3. The tapping attachment of claim 2 wherein the main shaft further comprises a chuck fixedly mounted on one end of the main shaft, the chuck being adapted to fixedly receive the tap.

4. The tapping attachment of claim 3 wherein the main shaft extends within the interior cavity of the housing and is rotatably mounted on the interior surface of the front and rear covers by a pair of bearings.

5. The tapping attachment of claim 4 wherein the main shaft protrudes through the front cover such that the chuck is positioned outside the housing.

6. The tapping attachment of claim 2 wherein the drive shaft protrudes through the top wall of the housing, the drive shaft comprising a first end that is externally accessible and a second end that is positioned in the interior cavity.

7. The tapping attachment of claim 6 wherein the drive shaft is rotatably coupled to the top wall of the housing such that the drive wheel is positioned between the pair of discs.

8. The tapping attachment of claim 2 further comprising a guide member assembly adapted to support an object to be tapped.

9. The tapping attachment of claim 8 wherein the guide member assembly comprises:
   (a) a guide post fixedly coupled to the housing and extending outwardly therefrom, and
   (b) a guide member slidably mounted on the guide post.

10. The tapping attachment of claim 9 wherein the guide member comprises:
   (a) a flattened guide plate, and
   (b) a sleeve coupled to the guide plate, the sleeve being dimensioned to receive the guide post.

* * * * *